US006400380B1

United States Patent
Ansberry et al.

(10) Patent No.: US 6,400,380 B1
(45) Date of Patent: Jun. 4, 2002

(54) METHOD TO SUPPORT APPLICATIONS THAT ALLOCATE SHAREABLE OR NON-SHAREABLE COLORCELLS IN A CONFERENCING NETWORK SYSTEM HAVING A HETERGENEOUS HARDWARE ENVIRONMENT

(75) Inventors: Catherine Malia Ansberry; Todd W. Fuqua, both of Redwood, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/387,504

(22) Filed: Feb. 13, 1995

(51) Int. Cl.[7] .................................................. G06F 3/14
(52) U.S. Cl. ..................................... 345/753; 709/204
(58) Field of Search ................................ 345/751–761; 709/204, 205

(56) References Cited

PUBLICATIONS

Adrian Nye, Xlib Programming Manual, O'Reilly & Assoc., pp. 199–200, 206–207, Mar. 1993.*

Asente et al., "X Window System Toolkit, The Complete Programmer's Guide and Specification", Digital Press, 1990, pp. 429–431.*

* cited by examiner

*Primary Examiner*—St. John Courtenay, III
(74) *Attorney, Agent, or Firm*—Monica D. Lee; Bracewell & Patterson, L.L.P.

(57) ABSTRACT

A method for an X windows conferencing enabler to support applications that use non-shareable color cells while running in a conference in which the various X server participants differ in their support of visual classes is disclosed. In the method, an application request to allocate and initialize non-shareable colorcells and is displayed in a conference such that the colors for each X server participant are as close to that requested by the application as the hardware supports. The conference enabler distributes all of the non-shareable requests to each participant in the conference that supports the requests. For those participants that do not support those requests, a NoOp request is sent in place of the allocation requests and an AllocColor or AllocNamedColor is sent in place of the initialization request. Errors and replies are moderated so that the application only receives those errors and replies that are consistent with its X server's expected behavior.

1 Claim, 3 Drawing Sheets

METHOD TO SUPPORT APPLICATIONS THAT ALLOCATE SHAREABLE OR NON-SHAREABLE COLORCELLS IN A CONFERENCING NETWORK SYSTEM HAVING A HETERGENEOUS HARDWARE ENVIRONMENT

CROSS-REFERENCE TO RELATED APPLICATION

The present application is related to U.S. patent application Ser. No. 08/387,501, entitled Method and System For Switching Between Usrs In A Conference Enabled Application; U.S. patent application Ser. No. 08/387,501 now U.S. Pat. No. 5,887,170, entitled Management And Classification Of Events For An X Windows Conferencing Enabler, U.S. patent application Ser. No. 08/387,502 now U.S. Pat. No. 6,219,044, entitled Method For Managing Top-Level Windows Within A Conferencing Network System, U.S. patent application Ser. No. 08/387,503 now U.S. Pat. No. 5,715,392, entitled Method For Managing Visual Type Compatibility In A Conferencing Network System Having Heterogeneous Hardware, U.S. patent application Ser. No. 08/387,505, entitled Method For Managing Pixel Selection In A Network Conferencing System, U.S. patent application Ser. No. 08/387,506 now U.S. Pat. No. 5,640,540, entitled Method And Apparatus For Translating Key Codes Between Servers Over A Conference Networking System, all filed of even date herewith by the inventors hereof and assigned to the assignee herein, and incorporated by reference herein.

BACKGROUND OF THE INVENTION

1. Technical Field

The present invention relates, generally, to application conferencing over a network system and, more specifically, to a method for a conferencing enabler to support applications that use either shareable or non-shareable colorcells while running in a conference in which various servers on the network system support different visual classes. More specifically still, the present invention is directed towards a method that allows applications to run in conference mode over the network system with colors as close as possible to that requested by the application, based on the capabilities of each server in the conference.

2. Description of the Related Art

Operating under X Windows provides distributed client/server support for two dimensional graphics. The X server manages the display for the application, two dimensional graphics within the window. The X Window conferencing enabler appears to the application to be an X server, while at the same time appearing to the X server as an application, as shown below. The X Windows conferencing enabler then connects to multiple X servers on behalf of the application, displaying the application's windows on each display. The application is not aware that it is being displayed on multiple X servers. Such a networking system is fully described in commonly assigned patent application Method And System For Switching Between Users In A Conference Enabled Application, Ser. No. 08/387,500 now U.S. Pat. No. 5,557,725, incorporated herein by reference for all purposes.

In the absence of a conferencing enabler, the application connects to an X server and communicates with it using X protocol, and asks the X server to create resources such as X windows on the server. In addition, the X server has resources that it has defined that may be used by any application that is connected to that server. In general, resources that are created by the server are those that describe the environment of that server. Many of these resources are provided to the application when it initially connects to the X server. X server defined resources include a defined set of visual types that indicate the ways that the server may be used to display colors. Every application that creates a window to display graphics on that server must use one of these types. Every X server indicates which of these visual types is its default visual type.

There are six visual classes supported by X windows, of which any server may support one or several. When an application needs to display an object of a given color, the application must first "allocate" colorcell. This will reserve that colorcell (referred to by a pixel value), prior to using it. Depending upon the way in which the pixel is allocated, the application must use some means to indicate to the server the color (that is, the red, green and blue intensities) that the pixel should represent. The X server will display the color that is as close as possible to that requested by the application. (The ability of the X server to display a given color is ultimately determined by the graphics adaptor which it is using.)

Of these six visual classes, three of them allow an application to change the entries in the associated colormap (that is, they allow entries in the colormap to be allocated as read/write) and three of them do not. These classes are separated as follows:

| read only | read/write |
|---|---|
| StaticGray | GrayScale |
| StaticColor | PseudoColor |
| TrueColor | DirectColor |

Read only colorcells are made available to the other applications using the X server as well, thus they are "shareable" colorcells. Non-shareable colorcells are those that are allocated as read/write cells, and cannot be allocated by other applications. When an application allocates a colorcell as non-shareable (with an AllocColorCells or AllocColorPlanes request), the red, green and blue values associated with that colorcell are not initialized. It is the application's responsibility to set the desired red, green and blue values with a StoreColors or StoreNamedColor request. If an application attempts to use a pixel value without first allocating it and, if required, initializing it, the application has no guarantee as to what actual color will be displayed. In addition, if an application attempts to initialize a colorcell that It has not allocated, it will receive an AccessError.

The behavior of the X server in response to a request to allocate an entry differs based on the visual type which is being used. The conditions are summarized in the following table:

TABLE 1

Summary of visual type responses to an application request to allocate an entry in its colormap.

| | server response to read only allocation attempt | server response to read/write allocation attempt |
|---|---|---|
| READ ONLY visual types | Closest available pixel allocated. Never an error. | Always an error. |

TABLE 1-continued

Summary of visual type responses to an application request to allocate an entry in its colormap.

| | server response to read only allocation attempt | server response to read/write allocation attempt |
|---|---|---|
| READ/WRITE visual types | Exact pixel allocated or error if colormap is full. | Exact pixel allocated or error if colormap is full. |

A problem arises when the X Windows conferencing enabler distributes an application to X servers which differ in their available visual types. When the application connects to the conferencing enabler, the enabler must inform that application which visual types are available. From that point forward, the application is able to use any and/or all of those visual types and the conferencing enabler must support the application's use of the visual types. This must be true, even if another X server with significantly different visual types joins a conference after the application has been made aware of its available visual types.

Therefore, if an application is using a visual type that supports solely read/write pixel allocations, the conferencing enabler must be able to simulate that behavior for X servers in the conference that do not have read/write visual types available. Specifically, the conferencing enabler must be able to simulate the following behavior in this case, 1. If the application believes it is using a read/write visual class, it can expect to receive AllocError(s) (meaning the X server could not allocate a shareable cell) when it attempts to allocate any type of colorcell. It would be the application's responsibility to react appropriately to such an error.
2. If an application attempts to initialize a colorcell that it has not allocated, it should receive an AccessError.
3. The application should get the closest colors available on each X server to what it requests.
4. Colorcells that are used without being explicitly allocated or initialized will display as "unpredictable" colors. That is, the exact color displayed is determined by the history of the X server, and is unknown to the application.

In a similar manner, if an application is using a visual type that supports solely read/only allocations, the conferencing enabler must be able to simulate that behavior for X servers in the conference that do not have read/only visual types available. Specifically, the conferencing enabler must be able to simulate the following behavior in this case.

1. If the application believes it is using a read/only visual class, it can not receive AllocErrors (meaning the X server could not allocate a shareable cell) when it attempts to allocate a shareable colorcell.
2. The application should get the closest colors available on each X server to what it requests.
3. Colorcells that are used without being explicitly allocated will display as unpredictable colors.

If the X conferencing enabler does not compensate for the differences in visual types in a conference, applications that attempt to allocate either shareable or non-shareable colorcells would not be able to run within a conference in which all of the X servers did not support this type of allocation.

Accordingly, what is needed is a method for an X windows conferencing enabler to support applications that use either shareable or non-shareable colorcells while running in a conference in which the various X servers have different support of their respective visual classes. Additionally, what is needed is a method to allow the applications to run with the desired colors as close as possible to that requested by the application, based upon the capabilities of each X server in the conference.

SUMMARY OF THE INVENTION

It is therefore one object of the present invention to provide application conferencing over a network system.

It is another object of the present invention to provide a method for a conferencing enabler to support applications that use either shareable or non-shareable colorcells while running in a conference in which various servers on the network system support different visual classes.

It is yet another object of the present invention to provide a method that allows applications to run in conference mode over the network system with colors as close as possible to that requested by the application, based on the capabilities of each server in the conference.

The foregoing objects are achieved as is now described. According to the present invention, a method for an X windows conferencing enabler to support applications that use non-shareable color cells while running in a conference in which the various X server participants differ in their support of visual classes is disclosed. In the method, an application requests to allocate and initialize non-shareable colorcells and is displayed in a conference such that the colors for each X server participant are as close to that requested by the application as the hardware supports. The conference enabler distributes all of the non-shareable requests to each participant in the conference that supports the requests. For those participants that do not support those requests, a no operation request is sent in place of the allocation requests and an allocate color or allocate named color order is sent in place of the initialization request. Errors and replies are moderated so that the application only receives those errors and replies that are consistent with its X server's expected behavior.

Also presented is a method to support X Windows conference enabled applications that allocate shareable colorcells by a conference enabler. This is accomplished by distributing the AllocColor and AllocNamedColor to each participant in the conference and then returning the master's reply or error to the application, the conference enabler is able to support heterogeneous hardware for such applications. The enabler must also reset the X servers that allocated colorcells successfully if the master did not. On the other hand, incompatible X servers are prevented from interacting with the application in the future if they receive an error when the master is successful.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The operating environment in which the present invention is implemented is includes a networking system that has a conferencing enabler that allows an application to be conferenced amongst a plurality of X servers. A more detailed understanding of the environment is provided in commonly assigned U.S. patent application Ser. No. 08/387,506, now U.S. Pat. No. 5,640,540, titled Method and Apparatus For Translating Key Codes Between Servers Over a Conference Networking System and in commonly assigned U.S. patent application Ser. No. 08/387,505, titled Method For Managing, Pixel Selection In A Network Conferencing System.

When an application desires to use a non-shareable colorcell to display a certain color, it performs two steps. The first step allocates the cell using an AllocColorCells or AllocColorPlanes, which are both well known cell allocation requests within the X Window system. This allocation marks the cells as non-shareable; however, the contents of the cells are not initialized. Using the cell at this point would display unpredictable colors. Specifically, the exact color displayed is determined by the history of the X server and is unknown to the application at this time. The second step is to initialize the contents of the cells with the StoreColors or StoreNamedColor requests.

Once both of these steps are successfully completed, an application then may use the cell and be guaranteed that the color displayed is as close as the X server can provide to that which was requested.

Figure 1:
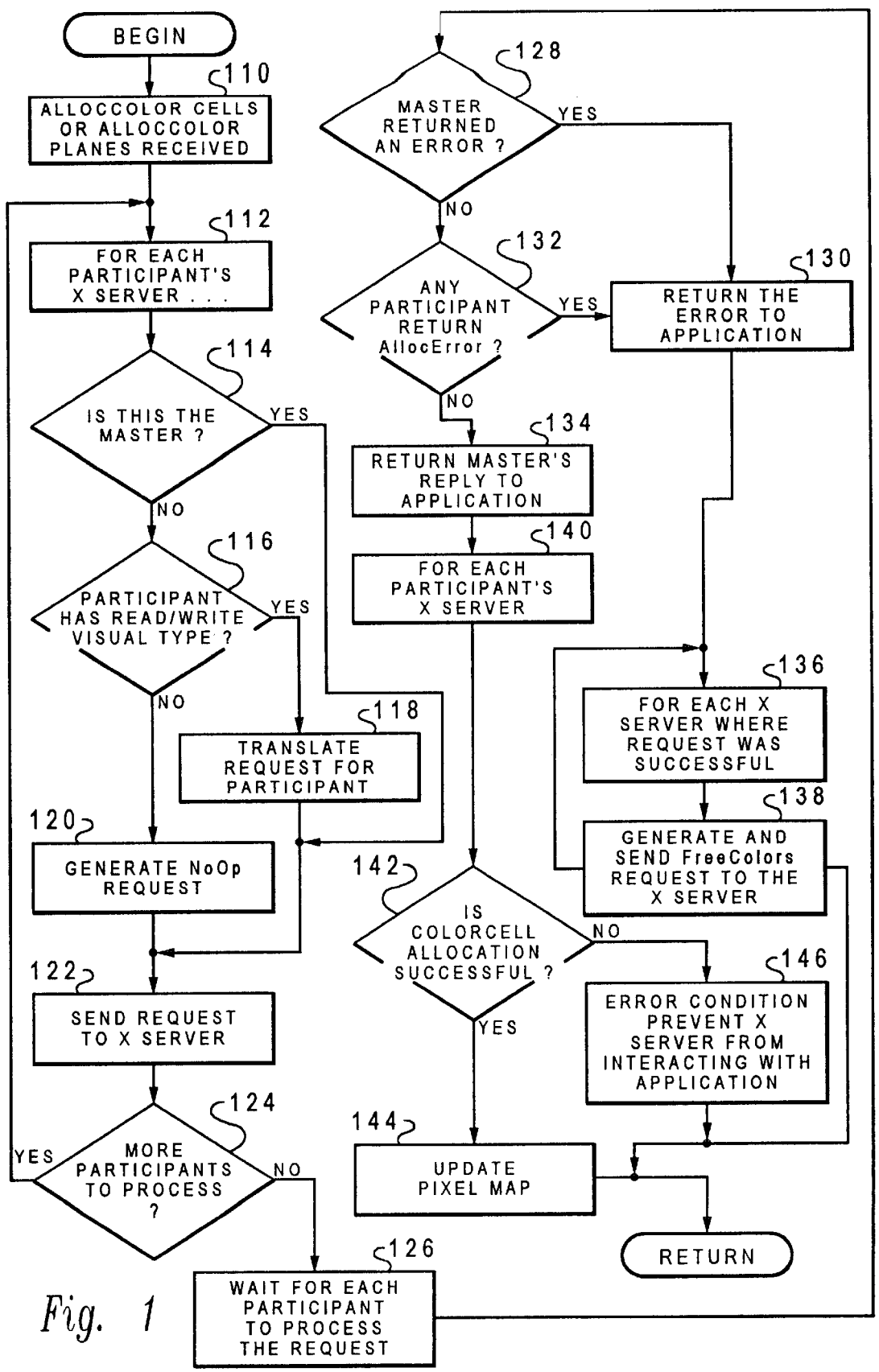
FIG. 1 depicts in accordance with a preferred embodiment of the present invention a method of allocating colorcells for read/write access.

When a conference enabler is attempting to support an application using the non-shareable colorcells, it must also deal with both of these steps while considering the capability of all the X servers in the conference to support the request of the application. To do so, the conference enabler implements the method depicted in the flowchart shown in FIG. 1.

In step 110, the application attempts to allocate one or more colorcells with either the AllocColorCells or AllocColorPlanes routines. This request, in step 112, is sent unchanged to the master under all conditions. The system determines if this participant is the master in step 114. Then, for the rest of the participants, the system determines for each participant if it is using a read/write colormap, in step 116, and if so, then translates the colormap ID in the request and sends it to that participant in step 118. Otherwise, if the participant has a read-only visual type, the system creates and sends a NoOp to the participant in steps 120 and 122, respectively. A NoOp is a protocol that has no effect on the X server participant and is used to substitute for a request that would be invalid for a read/only visual type.

Upon determining that every X server participant has received the request and has responded with a reply or error, the conferencing enabler then determines what to return to the application (steps 122–126). For example, in step 128, if the master returned an error, then the conference enabler sends that error to the application, in step 130. Otherwise, in step 132, if another X server participant returned an AllocError, then the conference enabler returns that error to the application also. Otherwise still, in step 134, the conference enabler then returns the master's reply to the application. The result is that if all of the X servers that supported the application's request succeeded, the application receives a reply. Otherwise, it receives an error and is responsible to handle the error.

When, in step 130, an error is returned to the application, then the conference enabler must make sure that each X server participant in the conference is returned to the state prior to the request. For each X server that received the request, in step 136, and if the request was successful on that X server, then, in step 138, the X server generates and sends a FreeColors request to free the colorcell(s) that are allocated on that X server.

If a reply is sent to the application in step 134, the conference enabler performs the following. In step 140, for each master/participant pair that successfully allocates the colorcell(s) (step 142), the conference enabler updates the pixel map to indicate the mapping (step 144). A method for supporting pixel translation in an X Windows application operating in a heterogeneous environment is more fully disclosed in commonly assigned U.S. patent application Ser. No. 08/387,505, entitled Method For Managing Pixel Selection In A Network Conferencing System. For each X server participant that fails with an error other than an AllocError, in step 146, the conference enabler takes the appropriate error action, such as preventing that X server from interacting with the application.

If the application receives a reply, rather than an error, in response to its request, then every X server in the conference that has a modifiable colormap has colorcell(s) allocated for that application. X servers that do not have a modifiable colormap do not yet have any colorcells allocated for that application. Once the system has allocated colorcells from the application to the participants, the application then attempts to initialize the cells allocated in the method described in the flowchart of FIG. 2 with the desired red, green, and blue color values, using the StoreColors or StoreNamedColor request.

Figure 2:
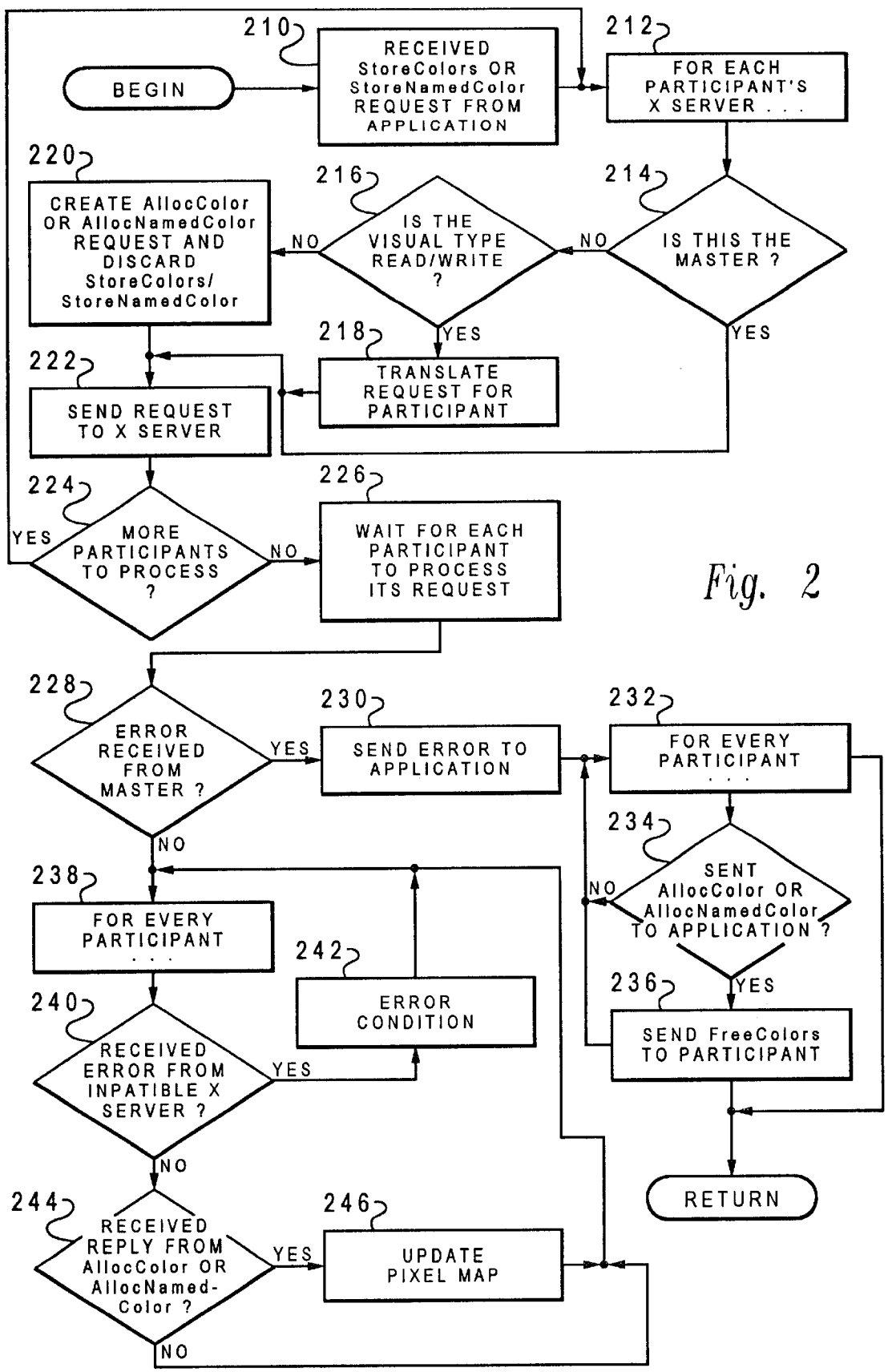
FIG. 2 is a flowchart depicting the method of the application attempting to initialize the cells allocated with the desired red, green, and blue color values, using the StoreColors or StoreNamedColor request; and, FIG. 3 depicts a block diagram of a flowchart supporting the method of applications that support allocating read-only colorcells.

The steps for initializing the colorcells is depicted more fully in the flowchart illustrated in FIG. 2. First, in step 210, the request to initialize the cells with StoreColors or StoreNamedColor is sent unchanged to the master. Then, in step 212 (and again in step 224), for each other participant, the system determines if this participant is the master (step 214). The system, in step 216, determines that the participant is using a modifiable colormap, in step 216, determines that the participant is using a modifiable colormap, such as being a read/write visual type, and if so, in step 218, translates the request and sends it to that X server participant. Otherwise, in step 220, the request to initialize the colorcells is replaced in this case with a request to allocate a shareable colorcell(s) using AllocColor or AllocNamedColor requests for those X servers that do not support read/write allocations. This enables those X servers to display the colors requested by the application without having to display the read/write function that the application is requesting.

Once it is determined that every X server has completed the request by sending the request back to the X server, in step 222, then the conference enabler waits for each participant to process its request in step 226. If, in step 228, an error is received from the master, the conference enabler returns the error to the application in steps 230–236. Otherwise, the conference enabler follows steps 238–246 and does not send anything to the application since StoreColor and StoreNamedColor do not have replies.

When errors are received in step 228, the conference enabler provides cell maintenance. Specifically, if an error is returned to the application in step 230, the conference enabler, in steps 232 and 234, determines every participant where an AllocColor or AllocNamedColor was substituted and successful, and sends a FreeColors request to unallocate the cell in step 236. If the master did not receive an error, then in step 238, for every incompatible X server that did receive an error, the conference enabler takes the appropriate error action in step 242. For example, the conference enabler may prevent that particular participant from interacting with the application in the future.

Otherwise, in step 244, if all the requests are successful, the system then determines for every X server that is using a read/only visual type, to update the pixel mapping tables with the master's pixel from the StoreColors or StoreNamedColor request and the reply from the substituted AllocColor or AllocNamedColor request (step 246).

Figure 3:
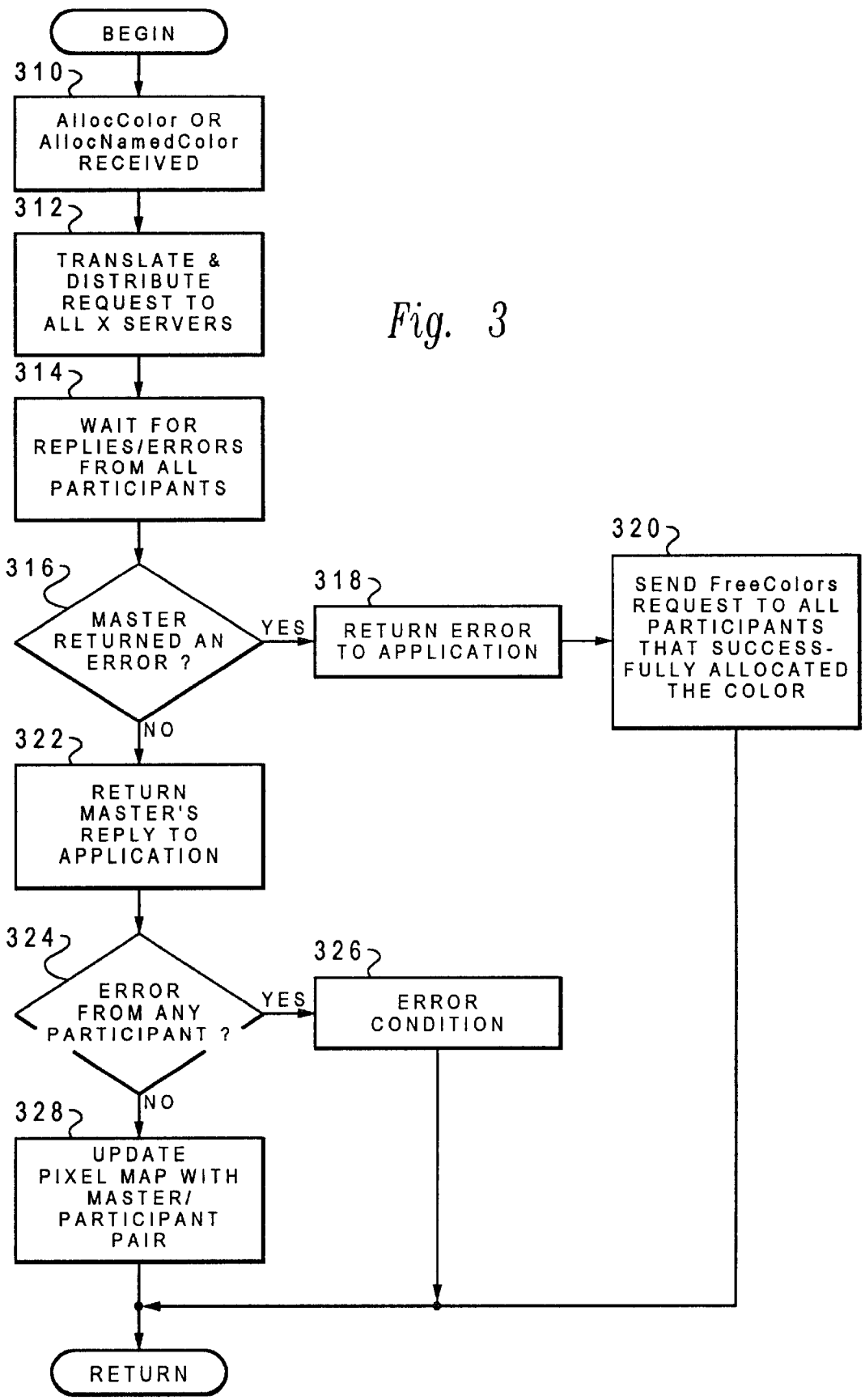

For applications that support allocating read-only colorcells, FIG. 3 depicts a block diagram of a flowchart supporting this method. In step 310, the conference enabler determines whether the AllocColor or the AllocNamedColor has been received by each participating application. Then, in step 312, the conference enabler translates and distributes the request to all X servers in the conference. In step 314, the system waits for replies or errors from all participants. In step 316, the conference enabler determines if the master application has returned an error and if so, in step 318, returns the error to the application and then in step 320, sends the FreeColors request to all participants that successfully allocate the color.

If, in step 316, the master has not returned an error, then the master's reply is returned to the application in step 322. Next, in step 324, the system determines whether an error has been received from any participant and if so, communicates that error condition, in step 326, to the conference enabler. Otherwise, in step 328, the system updates the pixel map with the master/participant pair.

The present invention also covers the situation where an X Windows conferencing enabler supports applications that use shareable colorcells while running in a conference in which the various X servers differ in their support of the visual classes. In the absence of a conferencing enabler, the method for accomplishing the application support is when an application issues an AllocColor or AllocNamedColor request, the X server attempts to allocate a pixel for the application that contains red, green, and blue as close as possible to what the application requested. If the visual class is modifiable, the X server returns an error if an exact match cannot be found.

While the invention has been particularly shown and described with reference to a preferred embodiment, it will be understood by those skilled in the art that various changes in form and detail may be made therein without departing from the spirit and scope of the invention.

What is claimed is:

1. A method for an X windows conferencing enabler to support applications that use non-shareable colorcells while running in a conference in which a plurality of X server participants differ in their support of visual classes comprises the steps of:

allocating non-shareable colorcells for a requesting application;
   distributing all of said non-shareable colorcell requests to each participant in said conference that supports said requests;
   for any participants not supporting said requests, sending a No Operations request instead of said allocation requests;

initializing said non-shareable colorcells for said requesting application for all participants supporting said requests;
   automatically sending an AllocColor or AllocNamedColor order in place of an initialization request to each participant not supporting said requests; and displaying in a conference said non-shareable colorcells in colors for each X server participant that supports said requests and displaying colorcells that are as close to that requested by said requesting application as allowed by a display used by each said X server participant that does not support said requests.

* * * * *

UNITED STATES PATENT AND TRADEMARK OFFICE
CERTIFICATE OF CORRECTION

PATENT NO.     : 6,400,380 B1
DATED          : June 4, 2002
INVENTOR(S)    : Ansberry et al.

It is certified that error appears in the above-identified patent and that said Letters Patent is hereby corrected as shown below:

<u>Title page,</u>
Item [75], Inventors, delete "Redwood" and please add -- Redmond --.

<u>Column 1,</u>
Line 11, please delete -- 08/387,501 -- and please add -- 08/387,500 --.

Signed and Sealed this

Nineteenth Day of November, 2002

*Attest:*

*Attesting Officer*

JAMES E. ROGAN
*Director of the United States Patent and Trademark Office*